UNITED STATES PATENT OFFICE.

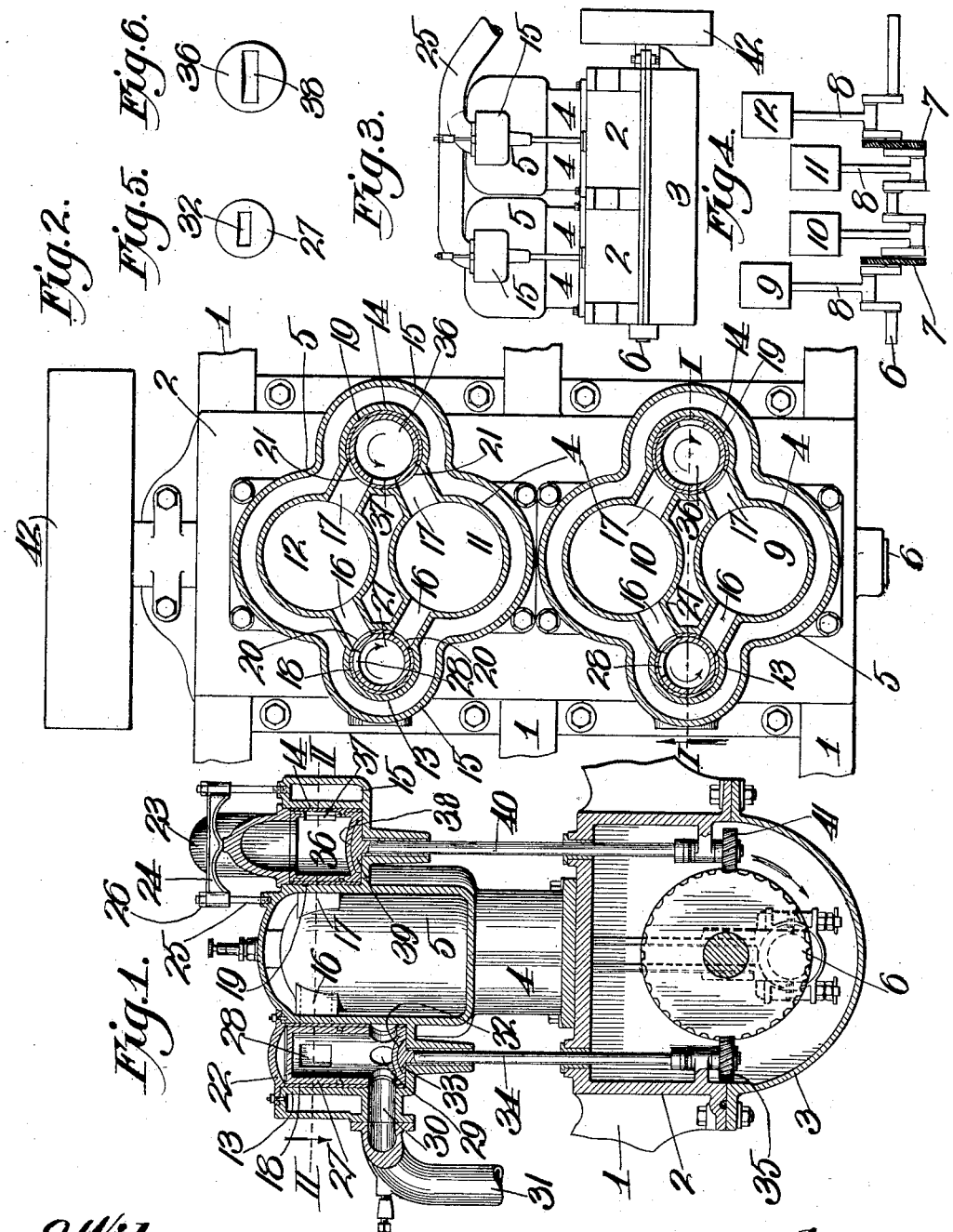

CHARLES L. COOKSON, OF KANSAS CITY, MISSOURI.

VALVE MECHANISM FOR GAS-ENGINES.

1,105,125.  Specification of Letters Patent.  Patented July 28, 1914.

Application filed October 19, 1911. Serial No. 655,549.

*To all whom it may concern:*

Be it known that I, CHARLES L. COOKSON, a citizen of the United States, residing at Kansas City, in the county of Jackson and State of Missouri, have invented certain new and useful Improvements in Valve Mechanism for Gas-Engines, of which the following is a specification.

This invention relates to gas engines and more particularly to the valves for controlling the passage of live gas into and dead or exhaust gas from the cylinders, and has for its object to produce an engine of the single or plural cylinder type having a rotary inlet valve for supplying gas to each cylinder or pair of cylinders and a rotary exhaust valve for receiving the gases from each cylinder or pair of cylinders, with the said valves at opposite sides of the cylinder or cylinders.

With this general object in view and others as hereinafter appear, the invention consists in certain novel and peculiar features of construction and organization as hereinafter described and claimed; and in order that it may be fully understood reference is to be had to the accompanying drawing, in which—

Figure 1, is a vertical section of a gas engine embodying my invention, on the line I—I of Fig. 2. Fig. 2, is a horizontal section on the line II—II of Fig. 1. Fig. 3, is a side view of the engine. Fig. 4, is a side view of the crank shaft and the pistons of the engine. Fig. 5, is an inverted plan view of one of the inlet valves of the engine. Fig. 6 is an inverted plan view of one of the exhaust valves of the engine.

In the said drawings, 1 indicates the frame of any suitable type, of the engine, said frame being cast with an inverted-U shaped body 2 forming the upper part of the crank case 3 indicating the lower part of such case. The engine shown is provided with four cylinders 4, and 5 indicates two water jackets each inclosing the upper halves of a pair of the cylinders.

6 is a crank shaft provided with four cranks, two of which project in one direction and the other two in the opposite direction, and secured rigidly to the crank shaft between the side portions of oppositely projecting cranks, is a pair of worm wheels 7. 8 are piston rods secured in the customary manner to the cranks of said shaft, and 9 and 10 and 11 and 12, are the pistons fitting in the cylinders 4. In the vertical plane of the space between pairs of the cylinders and at opposite sides of the same and cast integral therewith are inlet valve casings 13 and exhaust valve casings 14, and preferably surrounding said casings are extensions 15 of the water jackets 5. Connecting the upper end of each casing 13 with the upper ends of the adjacent pair of cylinders, are passages 16, similar passages 17 connecting the upper end of each casing 14 with the upper ends of the adjacent pair of cylinders. The said casings are provided respectively with bushings 18 and 19, having ports 20 and 21 in communication respectively with passages 16 and 17.

22 are caps (one only appearing) closing the upper ends of the casings 13 with a gas-tight relation, and 23 is a manifold exhaust pipe closing the upper ends of the casings 14 and said manifold pipe is clamped in position by cross bars 24, bearing upon the manifold and mounted upon vertical bolts 25 projecting upward from the engine, nuts 26 engaging the upper ends of said bolts and clamping the manifold pipe upon said casings 14 with a gas-tight relation.

Fitting rotatably in the bushings of the casings 13, are hollow cylindrical inlet-valves 27, each provided with a port 28, for engagement once in each revolution and at different periods of time, with the passages 16 of the adjacent pair of cylinders, and each provided near its lower end with a plurality of openings 29, through one or more of which gas is free at all times to enter said valves by way of passages 30 in the casings, supplied by pipe 31, which in practice will be a manifold pipe leading from a carbureter, not shown. The inlet valves 27 are provided with elongated sockets 32 in the underside of their lower ends, and fitting nonrotatably in said sockets are the T-heads 33 of valve-driving shafts 34, extending down into the crank case and provided at their lower ends with worm wheels 35 meshing with the worm wheels 7 at the same side of the axis of the crank shaft 6.

Fitting rotatably in the bushings 19 and preferably of much greater diameter than the inlet-valves, are hollow cylindrical exhaust valves 36, open at their upper ends and provided with ports 37, adapted once in each revolution and at different periods of time, to communicate with passages 17 leading to the adjacent pair of cylinders, and said valves are provided in the undersides of their lower ends with elongated sockets 38, receiving the T-heads 39 of a pair of shafts 40, extending down into the crank case and provided at their lower ends with worm wheels 41 meshing with worm wheels 7, at points diametrically opposite worm wheels 35. The engine is equipped with the customary fly wheel 42 secured on one end of shaft 6 and with any suitable ignition mechanism, not shown.

Assuming that the piston 9 fits in the undermost cylinder of Fig. 2, piston 10, in the second cylinder from the bottom, piston 11 in the third cylinder from the bottom and piston 12 in the topmost cylinder, and that said pistons occupy positions in said cylinders corresponding to their positions in Fig. 4, and that at the same time, the various valves occupy the positions shown in Fig. 2, it will be seen that an explosion has just occurred in the cylinder occupied by piston 9, and that said piston is starting downward and that at the same moment piston 12 is starting downward on its suction stroke. At the same time piston 10, is starting upward on its compression stroke and piston 11 upward on its exhaust stroke. The direction of rotation of the valves is indicated by the arrows in Fig. 2, from an inspection of which, in connection with Fig. 4, it will be understood that the explosions occur successively on pistons 9 and 11, as customery in four cycle engines.

An engine of this type possesses the following advantages: the comparative freedom of the inlet valve from accumulations of carbon, by being isolated from the exhaust valves; the small danger of being rendered inoperative for a time from unequal expansion, as the large capacity of the exhaust valve provides for quick escape of the hot dead gases; greater efficiency, as the quick escape of the dead gases diminishes chance of fresh gas being contaminated by mixture with dead gases in the cylinder; feasibility with which the valves and particularly the exhaust valve may be removed for grinding or other purposes as the exhaust valve will need more frequent attention than the inlet valve.

From the above description and drawing, it will be apparent that I have produced a gas engine valve mechanism possessing the features of advantage enumerated as desirable and I wish it to be understood that while I have illustrated and described the preferred embodiment of the invention I do not desire to be restricted to the exact details of construction shown and described as obvious modifications will suggest themselves to one skilled in the art.

I claim:

In a valve mechanism for internal combustion engines, a cylindrical valve casing having a removable cap at its upper end, a cylindrical bushing fitting said casing, said casing and bushing being provided with registered inlet ports near their lower ends and registered outlet ports near their upper ends, a hollow cylindrical valve fitting in said bushing and provided with an elongated socket in its lower end and with openings adapted to be registered with said inlet and outlet ports respectively, and a suitably journaled shaft extending into the lower end of said casing and having a head fitting removably in said valve socket for rotating said valve.

In testimony whereof I affix my signature, in the presence of two witnesses.

CHARLES L. COOKSON.

Witnesses:
   HELEN C. RODGERS,
   G. Y. THORPE.

---

Copies of this patent may be obtained for five cents each, by addressing the "Commissioner of Patents, Washington, D. C."